(12) United States Patent
Bhatt et al.

(10) Patent No.: US 12,417,231 B1
(45) Date of Patent: Sep. 16, 2025

(54) REAL-TIME AND CONTENT ANALYSIS

(71) Applicant: DISH Wireless L.L.C., Littleton, CO (US)

(72) Inventors: Mihir Bhatt, Denver, CO (US); Jaynish Patel, Muskegon, MI (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 18/603,599

(22) Filed: Mar. 13, 2024

(51) Int. Cl.
*G06F 16/2457* (2019.01)

(52) U.S. Cl.
CPC .............................. *G06F 16/24573* (2019.01)

(58) Field of Classification Search
CPC .... G06F 16/24573; H04L 51/00; H04L 63/00
See application file for complete search history.

(56) References Cited

U.S. PATENT DOCUMENTS

| | | | | |
|---|---|---|---|---|
| 2022/0167246 A1* | 5/2022 | Lim | ........................ | H04L 51/212 |
| 2023/0247033 A1* | 8/2023 | Rapp | ........................ | G06N 20/00 |
| | | | | 726/23 |
| 2023/0294002 A1* | 9/2023 | Salazar | ........................ | A63F 13/75 |
| | | | | 463/29 |
| 2024/0333683 A1* | 10/2024 | Šestan | ........................ | G06F 9/542 |
| 2024/0356968 A1* | 10/2024 | Sinks | ........................ | H04L 41/16 |

* cited by examiner

*Primary Examiner* — William P Bartlett
(74) *Attorney, Agent, or Firm* — Kilpatrick Townsend & Stockton LLP

(57) ABSTRACT

A method for flagging a message may include receiving the message. The method may include determining, utilizing at least one machine learning model, a score for the message based at least in part on one or more characteristics of the message. The score may represent a likelihood that the message is an illegitimate message. The method may include updating a database to include the message, the score, and/or the one or more characteristics associated with the message. The method may include providing at least a portion of data on the database to the at least one machine learning model such that the at least one machine learning model is retrained using the message, the score, and or the one or more characteristics. The method may include determining that the score is greater than a predetermined threshold. The method may include flagging the message as an illegitimate message.

14 Claims, 11 Drawing Sheets

REAL-TIME AND CONTENT ANALYSIS

BACKGROUND

As organizations continue to utilize technology to reach individuals, bad actors continue to find new ways to abuse the same technologies. Application to person (A2P) messaging is one such technology. A bad actor may try to take advantage not only of the recipient of a message, but the network(s) involved in the messaging as well.

BRIEF SUMMARY

A method for flagging a message may include receiving, by a computing system, the message. The method may include determining, by the computing system and utilizing at least one machine learning model, a score for the message based at least in part on one or more characteristics of the message. The score may represent a likelihood that the message is an illegitimate message. The method may include updating, by the computing system, a database to include the message, the score, and/or the one or more characteristics associated with the message. The method may include providing, by the computing system, at least a portion of data on the database to the at least one machine learning model such that the at least one machine learning model is retrained using the message, the score, and or the one or more characteristics. The method may include determining, by the computing system, that the score is greater than a predetermined threshold. In response to determining that the score is greater than the predetermined threshold, the method may include flagging, by the computing system, the message as an illegitimate message.

In some embodiments, the method may include transmitting, by the computing system, at least one of the message, the one or more characteristics, or the score to a contextual filtering system. The computing system may determine the score for the message in real-time.

In some embodiments, at least one machine learning model may include a behavioral model configured to perform behavioral analysis on the one or more characteristics of the message, and where the score may be at least partially based on the behavioral analysis. In some embodiments, the at least one machine learning model may include a sentiment and context model configured to perform sentiment and context analysis on the message and the score may be at least partially based on the sentiment and context analysis. In some embodiments, at least one machine learning model may include a link and attachment model configured to perform link and attachment analysis and the score may be based at least in part on the link and attachment analysis. In some embodiments, the at least one machine learning model may include a geographical model configured to identify geographical data associated with the message and the score is based at least in part on the geographical data.

In some embodiments, the method may include determining, by the computing system, sender data associated with a sender of the message. The method may include accessing, by the computing system, a database may include historical network data associated with historical illegitimate messages. The method may include determining, by the computing system and using a rules-based model, that the sender data corresponds to the historical network data associated with historical illegitimate messages.

A system may include one or more processors, a machine learning module including a plurality of machine learning models, a network monitor configured to monitor traffic on a cellular network, and a computer-readable medium. The computer-readable medium may include instructions that, when executed by the one or more processors, cause the system to perform operations. According to the operations, the system may receive a message. The system may determine, utilizing at least one machine learning model of the plurality of machine learning models, a score for the message based at least in part on one or more characteristics of the message. The score may represent a likelihood that the message is an illegitimate message. The system may update a database to include the message, the score, and/or the one or more characteristics associated with the message. The system may provide at least a portion of data on the database to the at least one machine learning model such that at least one machine learning model is retrained using the message, the score, and or the one or more characteristics. The system may determine that the score is greater than a predetermined threshold. The system may flag the message as an illegitimate message.

In some embodiments, the cellular network may be an open radio access network. The open radio access network may include a 5G wireless network implemented in a cloud-based architecture. The system may utilize an online learning algorithm to determine new characteristics associated with new illegitimate messages and update the database to include the new characteristics. The system may perform the operations in real-time. The message, the one or more characteristics, and the score may be provided to the contextual filtering system.

A non-transitory computer-readable medium may include instructions that, when executed by one or more processors, cause the one or more system to perform operations. The operations may include receiving, by a computing system, the message. The operations may include determining, by the computing system and utilizing at least one machine learning model, a score for the message based at least in part on one or more characteristics of the message. The score may represent a likelihood that the message is an illegitimate message. The operations may include updating, by the computing system, a database to include the message, the score, and/or the one or more characteristics associated with the message. The operations may include providing, by the computing system, at least a portion of data on the database to the at least one machine learning model such that the at least one machine learning model is retrained using the message, the score, and or the one or more characteristics. The operations may include determining, by the computing system, that the score is greater than a predetermined threshold. In response to determining that the score is greater than the predetermined threshold, the operations may include flagging, by the computing system, the message as an illegitimate message.

In some embodiments, the operations may include transmitting, by the computing system, at least one of the message, the one or more characteristics, or the score to a contextual filtering system. The computing system may determine the score for the message in real-time. The computing system may utilize an online learning algorithm to determine new characteristics associated with new illegitimate messages and update the database to include the new characteristics. The operations may include determining, by the computing system, sender data associated with a sender of the message. The operations may include accessing, by the computing system, a database may include historical sender data associated with historical illegitimate messages. The operations may include determining, by the computing device and using a rules-based model, that the sender data corresponds to the historical sender data associated with historical illegitimate messages. The operations may include receiving, by the computing system, data from a sender associated with the message indicating one or more characteristics to be whitelisted. The operations may include updating, by the computing system, the database to include the one or more characteristics to be whitelisted.

DETAILED DESCRIPTION

Figure 1:
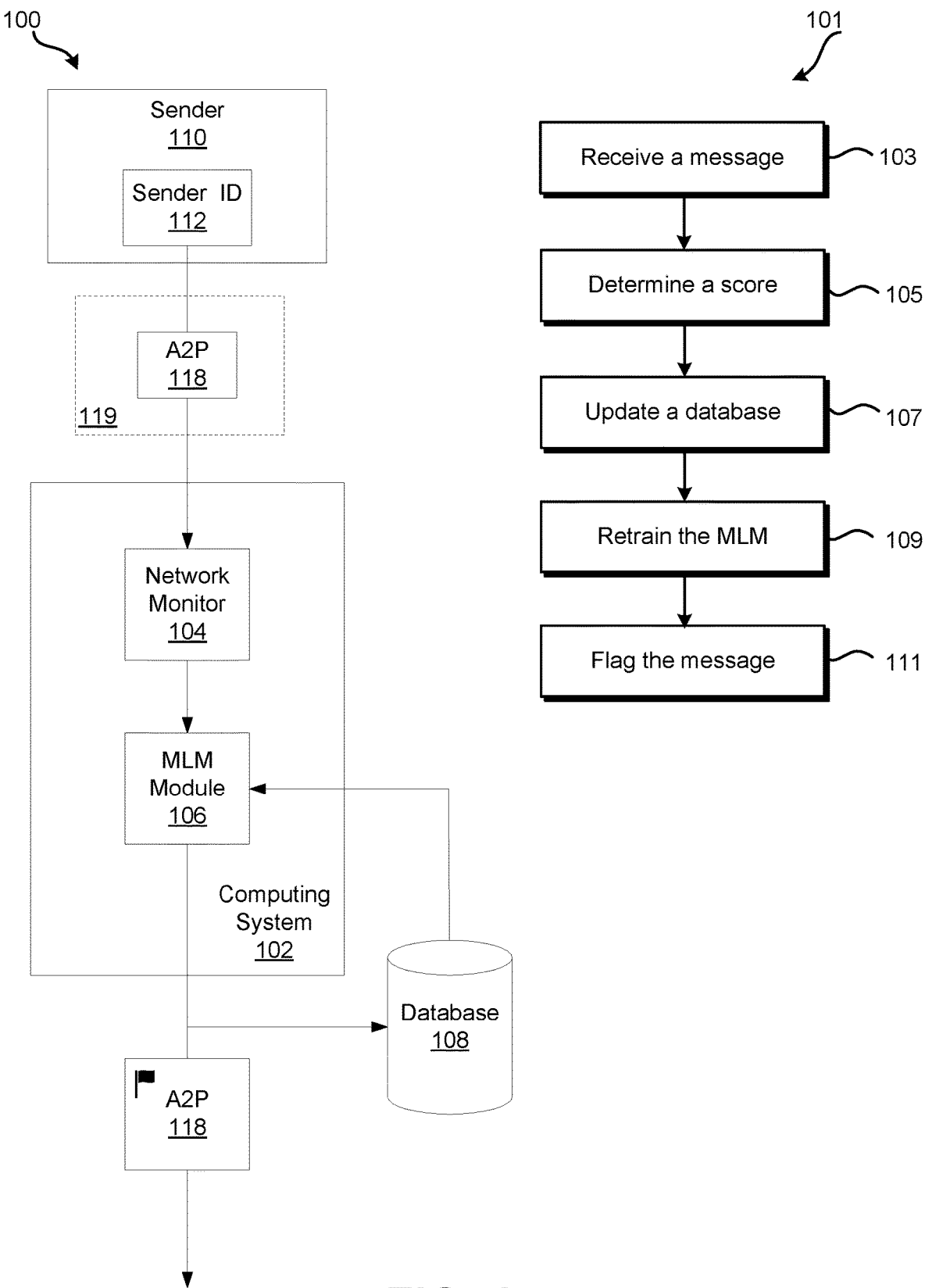
FIG. 1 illustrates a system and a process for real-time illegitimate message identification, according to certain embodiments.

Businesses and other entities are always looking for new ways to engage with their users (e.g., members, customers, etc.). Mailed advertisements have waned in favor of more targeted marketing via email, for example. Spam has since pervaded email generally, and many emails may be spoofed, or appear to be from someone other than the actual sender. The sender of these emails may be attempting to steal data or trick the recipient of the email or perform some other fraud. As technology has evolved again, however, bad actors have also evolved, attempting to leverage other systems with bad intentions.

One example of this is application to person (A2P) messaging. A2P messaging is prevalent already and growing in use by many different entities. A small business, for example, may utilize a marketing service that sends short-messaging service (SMS) messages with coupons to one or more customers. An airline may send an SMS reminder about a flight status to a group of passengers or related individuals. A financial institution may send a one-time code via SMS to a user for dual authentication purposes. Other examples of A2P messaging are readily evident. A bad actor, however, may generate an SMS that appears to be from a legitimate application (as described above) with a link to enter some personal data (e.g., phishing). In other words, the bad actor may send an SMS to take advantage of an end user. In another example, a bad actor may utilize A2P messaging to harass, bully, or otherwise abuse an intended recipient of the A2P message. As the A2P messages may be routed through a wireless network provider, the wireless network provider (e.g., a mobile network operator (MNO) or a mobile virtual network operator (MVNO)) may be in a position to reduce the number of illegitimate messages sent through a wireless network—if the illegitimate messages can be identified and flagged soon enough.

Whether targeting a message recipient or the network(s) used to transmit the SMS, it may be possible to identify and filter these messages on a user equipment (UE) level. The user associated with the UE may therefore be protected, either receiving a warning indicating that the SMS is likely to be illegitimate or not receiving the SMS at all. In order to reach the UE, however, the SMS still had to utilize the wireless network and resources thereof. In person to person messaging, this may be a practicable solution—an individual may only send so many SMS messages in a given time. With A2P messaging, an application may send thousands of messages at a time, utilizing significant resources of the wireless network provider. This not only costs the wireless network provider bandwidth on the wireless network, but also may lead to a poor recipient experience (e.g., in abusive illegitimate messages, successful phishing messages, etc.) Therefore, there is a need to identify and filter illegitimate A2P messages in real-time (or near real time). Furthermore, because the senders of these illegitimate messages may evolve rapidly, there is a need to update systems to identify and filter the illegitimate A2P messages in real-time.

One solution may be to monitor the wireless network of the wireless network provider in order analyze incoming A2P messages as the A2P messages enter the network. A network monitor may intercept some or all of the A2P message traffic at a point of entry into the wireless network. The network monitor may also access general traffic data associated with the network, such as current load, network equipment statuses, outages, etc. After intercepting an A2P message (A2P), the network monitor may provide the A2P to a machine learning module (MLM). The MLM may include one or more machine learning models trained to analyze various characteristics of the A2P. For example, a first machine learning model may be trained to perform behavioral analysis associated with a sender of the A2P. A second machine learning model may be trained to perform sentiment and/or context analysis on the content of the A2P. A third machine learning model may be configured to analyze links and attachments that may be included in the A2P. A fourth machine learning model may be configured to identify geographical data associated with the A2P. Other machine learning models may perform other analyses.

Each of the machine learning models may generate a score based on the respective analysis performed by each machine learning models. The scores may then be analyzed by another machine learning model, where the scores may be combined to create a combined score. The combined score may then be compared to a predetermined threshold. If the combined score is greater than the predetermined threshold, the A2P may be flagged as an illegitimate message. The message, combined score (or individual scores), and/or data indicating the various characteristics of the A2P may be provided in a dataset, and the MLM and/or machine learning models thereof may be retrained at or near real-time. Furthermore, because the A2P is intercepted as it enters the wireless network, and the MLM may perform the various analyses in parallel, the A2P message may be flagged (and/or filtered) at or near real-time as well. This may increase the efficiency of the wireless network by reducing the traffic of illegitimate messages. This solution may also increase a recipient experience, by reducing the number of illegitimate messages received.

FIG. 1 illustrates a system 100 and a process 101 for real-time illegitimate message identification, according to certain embodiments. The system 100 may include a computing system 102, associated with a wireless network provider. The wireless network provider may be a stand-alone 5G network provider. Some or all of the components of the computing system 102 may be distributed across a cloud architecture, hosted on a publicly available cloud network. The components of the computing system may include a network monitor 104 and a machine learning module (MLM) 106. The computing system 102 may also include a database 108. In some embodiments, the database 108 may be stored on a different computing system. The computing system 102 may also communicate with one or more functions of a 5G core of the wireless network provider such as a short message service center (SMSC), an access management function (AMF), a charging function (CHF) or any other appropriate function.

The network monitor 104 may be configured to monitor some or all network traffic on a network 119. The network monitor 104 may monitor one or more routes or pathways, through which various types of traffic may enter and be transmitted through the network. For example, the network monitor 104 may intercept A2Ps as they enter the network 119. The network monitor 104 may intercept a portion of the A2Ps sent through the network 119 or may intercept all A2Ps. In other words, the network monitor 104 may be a part of a typical route for A2P traffic through the network 119.

The MLM 106 may include one or more machine learning models configured to analyze one or more characteristics of an A2P message. For example, the MLM 106 may include a behavior model trained to analyze the behavior of a sender and/or a sender ID (e.g., the sender 110 and/or the sender ID 112). The behavior model may include one or more machine learning models, such as recurrent neural networks (RNN), Keras, TensorFlow, etc. The behavior model may also include time series models (e.g., ARIMA, SARIMA, etc.), long short-term memory neural networks, a gated recurrent unit, and any other suitable machine learning models. The behavior model may be trained using historical data associated with the sender 110 and/or the sender ID 112, such as normal sending patterns, message frequency (e.g., how often the sender ID 112 transmits an A2P), message volume (e.g., how many A2Ps the sender ID 112 sends), a typical recipient (e.g., a recipient list and/or demographics), and other such historical data.

The MLM 106 may also include a sentiment and context model. The sentiment and context model may include natural language processing models (NLP), context aware recommender systems, RNNs, and other suitable machine learning models. The sentiment and context models may be trained using language data. The language data may be sender-specific (e.g., a typical message content associated with the sender ID 112) or may be more general including language included in messages from a wide variety of sender IDs. In some embodiments, the language data may include other data not related to A2P messages (e.g., other datasets for training an NLP).

The MLM 106 may also include a link and attachment model. The link and attachment model may include machine learning models for deep learning-based anomaly detection such as convolutional neural networks (CNNs), etc. The link and attachment model may be trained on malicious site data. The malicious site data may include data associated with known malicious sites such as IP addresses, images typical of malicious sites, etc.

The MLM 106 may also include a geographical model. The geographical model may include clustering algorithms (e.g., K-Means, Density based spatial clustering with noise, and/or other clustering algorithms, a geographical information system (GIS), one or more geostatistical models, and/or other suitable models. The geographical model may be trained using historical geographical data. The historical geographical data include information such as IP addresses, country codes, other identifiers that may indicate an A2P as being routed through a country, typical routing information (e.g., routes and route lengths).

Some or all of the data used to train the various machine learning models may be included in the database 108. The database 108 may additionally or alternatively include individual messages received via the network 119. The database 108 may include a single dataset used (at least in part) to train all machine learning models included in the MLM 106 and/or the database 108 may include separate datasets to train one or more of the machine learning models included in the MLM 106. The database 108 may be included in the computing system 102 or may be separate from the computing system 102. Although only one database 108 is shown, there may be any number of databases 108.

At step 103, the computing system 102 may received an A2P 118 from the sender 110 and/or sender ID 112. The A2P 118 may be received by the network monitor 104. The sender ID 112 may include a short code, 10DLCC, or other such identifier used to communicate A2P messaging. The A2P 118 may be an SMS, a multimedia messaging service (MMS) message, a voice communication, or any other such communication. The sender ID 112 may be related to and/or a component of the sender 110. For example, the sender 110 may be a bank, and the sender ID 112 may be a sender ID used for sending one time passcodes (OTPs) to users for dual authentication. In another example, the sender 110 may be a small business using a third-party marketing service to reach customers. The sender ID 112 may be part of a service offering of the third-party marketing service and the A2P 118 may indicate that the A2P 118 is from the small business. Other examples are readily apparent. Although only one A2P 118 is represented, it should be understood that the A2P 118 may represent a plurality of messages, sent to one or more users (or recipients). The each of the respective messages in the plurality of messages may be identical or may be different from each other.

At step 105 of the process 101, the MLM 106 may determine a score associated with A2P 118. The score may represent a likelihood that the A2P 118 is an illegitimate message. The MLM 106 may utilize one or more models to determine the score. For example, the behavior model, the sentiment and context model, the link and attachment model, and/or the geographical model may each generate respective scores based on various characteristics of the A2P 118. The MLM 106 may then combine the respective scores using a combinatory model. The combinatory model may weight each of the respective scores according to predetermined weights. For example, the respective score associated with the sentiment and context model may be weighted at a 1.1, indicating that the sentiment and context model is more important than average (average here being 1), whereas the score associated with the link and attachment model may be weighted at a 0.7. In another example, the combinatory model may dynamically shift the weights of each of the respective score based on the particular characteristics of the A2P 118, network data of the network 119, recipients associated with the A2P 118, or other such measures. The combinatory model may therefore generate a combined score from the respective scores, where the combined score is based on the particular characteristics of the A2P 118.

The MLM 106 may additionally or alternatively analyze metadata associated with the A2P 118. The metadata may include an internet protocol (IP) address, routing information (e.g., received from an AMF and/or SMSC), charging information (e.g., a CHF), destination information, and other such information. The MLM 106 may compare the metadata to historical metadata associated with other A2P messages sent by the sender 110 and/or the sender ID 112.

At step 107, the computing system 102 may update the database 108 to include the A2P 118, the one or more characteristics of the A2P 118 (or data indicating the one or more characteristics), the combined score, and/or the respective scores. The database 108 may be updated to include only those characteristics used by the MLM 106 or may include all characteristics of the A2P 118. The one or more characteristics, the A2P 118, and/or the combined and respective scores may be stored in one dataset and/or multiple datasets within the database 108.

At step 109, the MLM 106 may be retrained using one or more datasets included within the database 108. Retraining the MLM 106 may include retraining some or all of the various models included in the MLM 106. For example, the MLM 106 may have performed sentiment and context analysis on the A2P 118, but not performed geographical analysis on the A2P 118. Therefore, the dataset may only be updated with data associated with the sentiment and context analysis, and only the sentiment and context models retrained within the MLM 106. In other embodiments, each of the various models of the MLM 106 may be retrained.

In some embodiments, the computing system 102 and/or the database 108 may receive user feedback associated with the A2P 118, the respective scores, and/or the combined score. The database 108 may then be updated to include the user feedback. Some or all of the models of the MLM 106 may be retrained based at least in part on the user feedback. The MLM 106 (and machine learning models thereof) may be retrained at or near real-time. Because the network monitor 104 may intercept the A2P 118 as it enters the network 119, the MLM 106 may begin analyzing the characteristics of the A2P 118 almost immediately. Furthermore, because the various models of the MLM 106 may operate in parallel, the respective scores may be generated quickly (e.g., 0.5 sec, 1 sec, etc.). The database 108 may therefore be continuously updated, and the MLM 106 continuously retrained. As bad actors may quickly alter the route, content, message type etc. of illegitimate messages, the MLM 106 may be continuously retrained, allowing the system 100 to provide more efficient flagging and filtering of illegitimate messages.

At step 111, the computing system 102 may flag the A2P 118 as an illegitimate message. The flag may be an annotation within the data of the A2P 118, a warning to a recipient, a warning to the sender 110 and/or the sender ID 112, and/or any other suitable type of indication. In some embodiments, the system 100 may include a contextual based filtering system. The contextual based filtering system may analyze filtered messages (such as the A2P 118) to generate a contextual view of illegitimate messages received via the network 119. The contextual based filtering system may be part of the computing system 102 and/or may be part of a different system. An output of the contextual filtering system may be provided to the database 108 and used to retrain the MLM 106. In some embodiments, the A2P 118 may be filtered and not delivered to intended recipients. In other embodiments, the A2P 118 may be delivered as normal.

Figure 2:
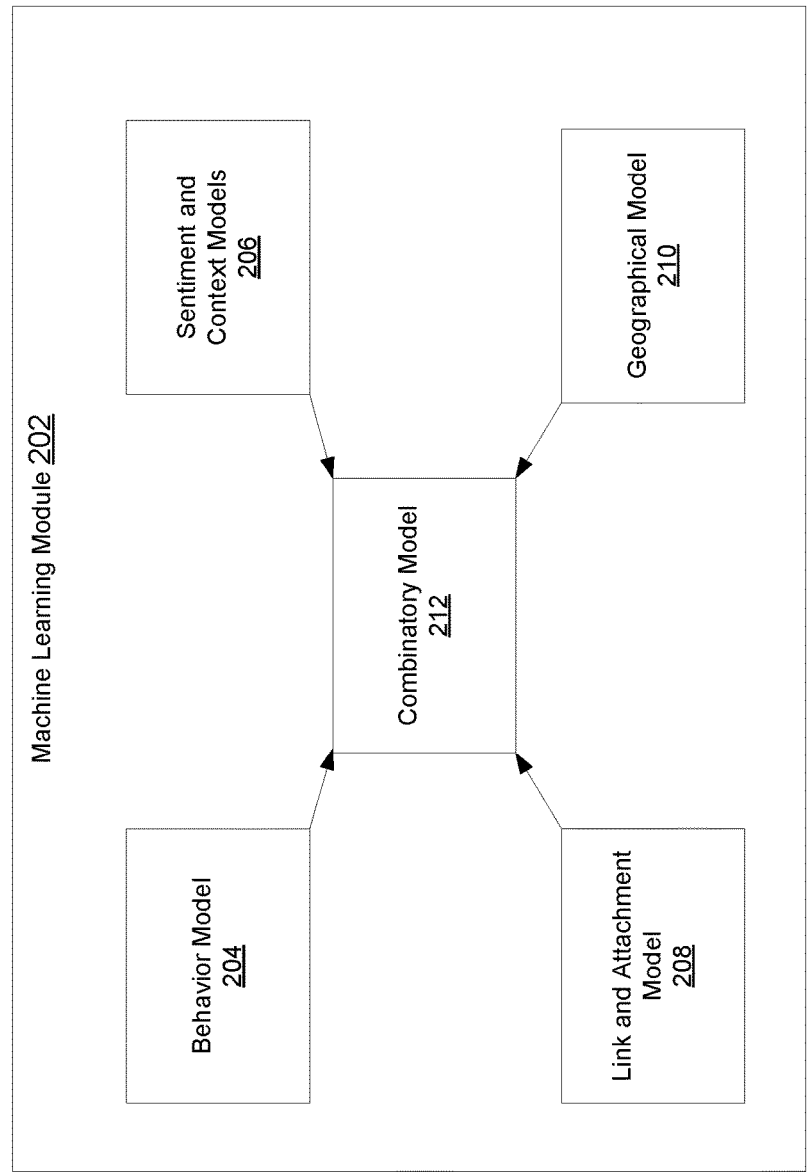
FIG. 2 illustrates a system including a machine learning module, according to certain embodiments.

FIG. 2 illustrates a system 200 including a machine learning module (MLM) 202, according to certain embodiments. The MLM 202 may be similar to the MLM 106 in FIG. 1 and include similar properties and functionalities. As such, the MLM 202 may be included in a broader computing system including one or more physical and virtual machines. The MLM 202 may include analysis models. For example, the MLM 202 may include a behavior model 204, a sentiment and context model 206, a link and attachment model 208, and a geographical model 210, and/or a combinatory model 212 (collectively the "models"). The MLM 202 may implement the models 204-212 on a single computing device or on separate computing devices.

The behavior model 204 may be trained to analyze the behavior of a sender and/or a sender ID (e.g., the sender 110 and/or the sender ID 112 in FIG. 1). The behavior model 204 may include one or more machine learning models, such as recurrent neural networks (RNN), Keras, TensorFlow, etc. The behavior model 204 may also include time series models (e.g., ARIMA, SARIMA, etc.), long short-term memory neural networks, a gated recurrent unit, and any other suitable machine learning models. The behavior model 204 may be trained using historical data associated with the sender 110 and/or the sender ID 112, such as normal sending patterns, message frequency (e.g., how often the sender ID 112 transmits an A2P), message volume (e.g., how many A2Ps the sender ID 112 sends), a typical recipient (e.g., a recipient list and/or demographics), and other such historical data.

The sentiment and context model 206 may include NLPs, context aware recommender systems, RNNs, and other suitable machine learning models. The sentiment and context model 206 may be trained using language data. The language data may be sender-specific (e.g., a typical message content associated with the sender ID 112) or may be more general including language included in messages from a wide variety of sender IDs. In some embodiments, the language data may include other data not related to A2P messages (e.g., other datasets for training an NLP).

The link and attachment model 208 may include machine learning models for deep learning-based anomaly detection such as convolutional neural networks (CNNs), etc. The link and attachment model 208 may be trained on malicious site data. The malicious site data may include data associated with known malicious sites such as IP addresses, images typical of malicious sites, etc.

The geographical model 210 may include clustering algorithms (e.g., K-Means, Density based spatial clustering with noise, and/or other clustering algorithms, a geographical information system (GIS), one or more geostatistical models, and/or other suitable models. The geographical model 210 may be trained using historical geographical data. The historical geographical data include information such as IP addresses, country codes, other identifiers that may indicate an A2P as being routed through a country, typical routing information (e.g., routes and route lengths).

The combinatory model 212 may include neural networks such as RNNs, Deep-learning neural networks, modular neural networks, and other suitable neural networks. The combinatory model 212 may also include other types of machine learning models. The combinatory model 212 may be trained at least in part on feedback provided by users and/or senders of A2P messages (e.g., the A2P 118, the sender 110, and sender ID 112). The combinatory model 212 may receive respective scores from each of the models 204-210 and combine the respective scores to generate a combined score. The respective scores may represent a confidence interval that the A2P is an illegitimate message, based at least in part on the characteristics analyzed by each of the models 204-212. For example, the geographical model 210 may determine that based on the analyzed geographical data, the respective score associated with the geographical model and the A2P is 0.8 (i.e., 80% confident). The respective scores may be represented by a number, decimal, percentage, or any other suitable means. The combinatory model 212 may weight each of the respective scores according to predetermined weights or may weight each of the respective scores dynamically. The combined score may be a total confidence interval that an A2P is an illegitimate message.

Figure 3:
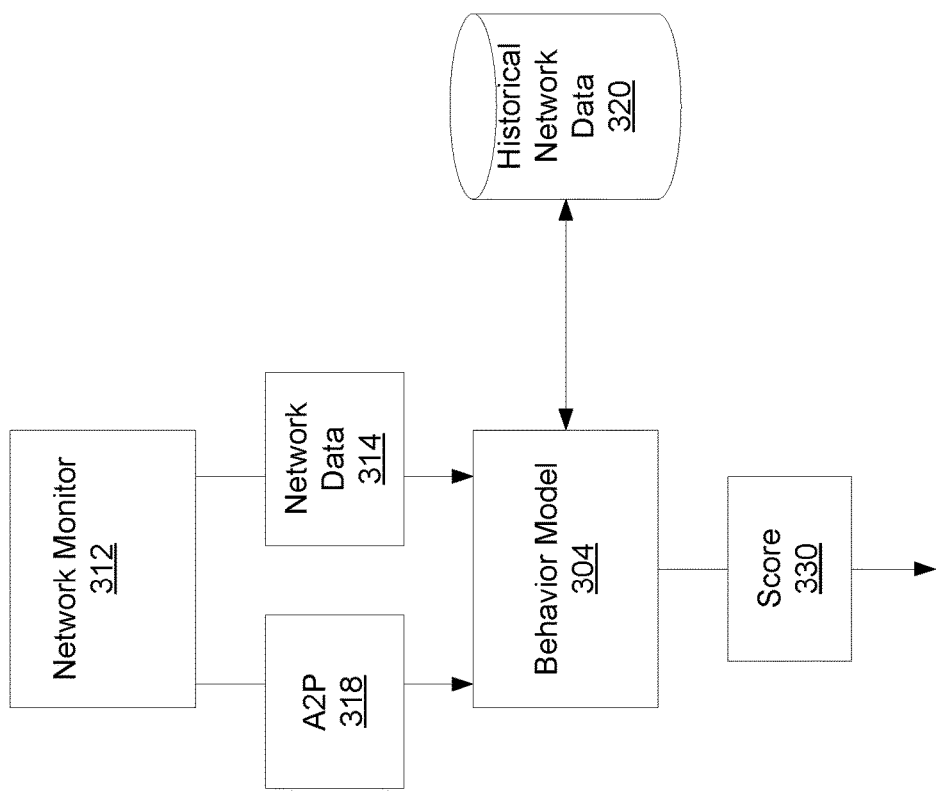
FIG. 3 illustrates a system for analyzing sender behavior using a behavior model, according to certain embodiments.

FIG. 3 illustrates a system 300 for analyzing sender behavior using a behavior model 304, according to certain embodiments. The system 300 may be similar to some or all of the system 100 in FIG. 1. The system 300 may include a behavior model 304, a network monitor 312, and historical network data 320. Some or all of the components of the system 300 may be implemented on a single computer system (e.g., the computing system 102) or may be implemented on separate computer systems. The network monitor 312 may be similar to the network monitor 104. Thus, the network monitor 312 may be be configured to monitor some or all network traffic on a network. The network monitor 312 may monitor one or more routes or pathways, through which various types of traffic may enter and be transmitted through the network. For example, the network monitor 312 may intercept A2Ps as they enter the network. The network monitor 312 may intercept a portion of the A2Ps sent through the network or may intercept all A2Ps. In other words, the network monitor may be a part of a typical route for A2P traffic through the network.

The behavior model 304 may include one or more machine learning models, trained to analyze sender behavior associated with an A2P message. The behavior model 304 may include machine learning models, such as recurrent neural networks (RNN), Keras, TensorFlow, etc. The behavior model 204 may also include time series models (e.g., ARIMA, SARIMA, etc.), long short-term memory neural networks, a gated recurrent unit, and any other suitable machine learning models.

The behavior model 304 may be trained on the historical network data 320. The historical network data 320 may be included on a database such as the database 108. The historical network data 320 may be included in a larger dataset on the database and/or may be a separate dataset. The historical network data 320 may include data associated with a sender and/or a seconder ID of an A2P (e.g., the sender 110 and/or the sender ID 112). The sender ID may include a short code, 10DLCC, or other such identifier used to communicate A2P messaging. The historical network data 320 a may include a typical message volume of the sender and/or the sender ID, a typical message rate, a typical message content, a time window, and other such data. The historical network data 320 may also include a normal content type of the sender and/or the sender ID.

The network monitor 312 may provide an A2P 318 and network data 314 to the behavior model 304. The A2P 318 may include a message content type, location and routing data, a sender ID, a link and/or attachment, and other such data. The A2P 318 may be intercepted by the network monitor 312 upon being received by the network (e.g., the network 119). The network data 314 may include general information about the network such as a current traffic load, network component status, time, traffic rate, etc. The network data 314 may also include network information associated with a sender ID of the A2P 318. For example, the network data 314 may include information indicating a message volume, message rate, time the A2P was transmitted, etc.

The behavior model 304 may then analyze one or more characteristics of the A2P 318 to determine a score 330. For example, the behavioral model 304 may determine that the sender ID associated with the A2P 318 is transmitting abnormal volume of A2P messages as compared to typical behavior of the sender ID. The behavioral model 304 may utilize some or all of the network data 314 and/or information included in the A2P 318. Some of the A2P messages included in the abnormal volume may appear to be from a different sender and/or sender ID. The behavior model 304 may nonetheless find links between the A2P messages based on the timing of the messages, content, routing, or other such information. For example, the behavior model 304 may determine that the A2P 318 (and others in the abnormal volume of messages) may be promotional messages sent outside a typical window associated with the sender ID. While the sender ID may typically transmit promotional messages, the A2P 318 being sent outside of the typical window may cause the behavior model 304 to determine that the A2P 318 is likely an illegitimate message. The behavior model 304 may then generate the score 330, indicating that the A2P 318 is likely an illegitimate message. The score 330 may then be transmitted to another component, such as the combinatory model 212 in FIG. 2.

Figure 4:
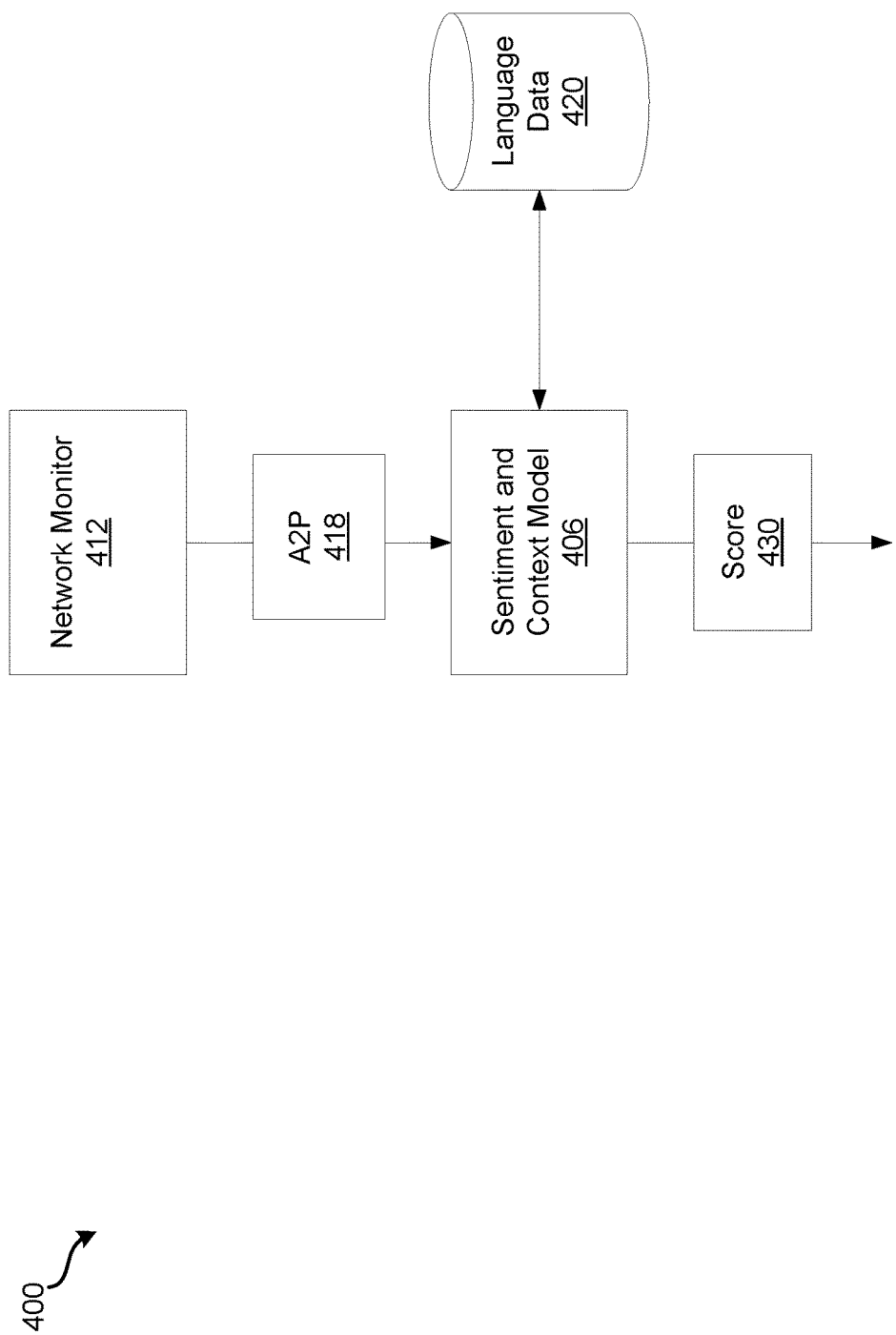
FIG. 4 illustrates a system for analyzing message content, according to certain embodiments.

FIG. 4 illustrates a system 400 for analyzing message content, according to certain embodiments. The system 400 may work separately from or in conjunction with the system 300, described in FIG. 3. The system 400 may include a behavior model 404, a network monitor 412, and language data 420. Some or all of the components of the system 400 may be implemented on a single computer system (e.g., the computing system 102) or may be implemented on separate computer systems. The network monitor 412 may be similar to the network monitor 104. Thus, the network monitor 412 may be configured to monitor some or all network traffic on a network. The network monitor 412 may monitor one or more routes or pathways, through which various types of traffic may enter and be transmitted through the network. For example, the network monitor 412 may intercept A2Ps as they enter the network. The network monitor 412 may intercept a portion of the A2Ps sent through the network or may intercept all A2Ps. In other words, the network monitor may be a part of a typical route for A2P traffic through the network.

The sentiment and context model 406 may include NLPs, context aware recommender systems, RNNs, and other suitable machine learning models. The sentiment and context model 406 may be trained using language data 420. The language data 420 may be included on a database such as the database 108. The language data 420 may be included in a larger dataset on the database and/or may be a separate dataset. The language data 420 may be sender-specific (e.g., a typical message content associated with a sender ID) or may be more general including language included in messages from a wide variety of sender IDs. In some embodiments, the malicious site data 520 may include other data not related to A2P messages (e.g., other datasets for training an NLP). For example, the malicious site data 520 may include websites, publicly available text (e.g., books, magazine, etc.) and other such data suitable to train language models. The sentiment and context model 406 may include multiple models trained on different languages (e.g., English, Chinese, Spanish, French, etc.). Thus, the sentiment and context model 406 may be trained to recognize and interpret multiple languages.

The sentiment and context model 406 may also include a context-aware recommender system. The context-aware recommender system may be trained to identify language specific to a sender ID. Using the context aware recommender system, the sentiment and context model 406 may identify content in an A2P message as being contextually similar to typical messages transmitted by the sender ID. For example, a first sender ID may be associated with promotional A2P messages. A second sender ID may be associated with bank related A2P messages. If an A2P from the first sender ID is promotional but uses different content than normal, the sentiment and context model 406 may identify the A2P as likely legitimate, as the A2P still includes promotional language. By contrast, another A2P from the second sender ID may include promotional language, but the sentiment and context model 406 may identify the other A2P as likely legitimate, because it is not a bank-related message.

The network monitor 412 may provide the A2P 418 to the sentiment and context model 406. The A2P 418 may include a message content type, location and routing data, a sender ID, a link and/or attachment, and other such data. The A2P 418 may be intercepted by the network monitor 412 upon being received by the network (e.g., the network 119). The sentiment and context model 406 may then analyze one or more characteristics of the A2P 418. For example, the sentiment and context model 406 may analyze the language and grammar (e.g., using an NLP) used in the content of the A2P. The sentiment and context model 406 may identify key words as being typical of spam or phishing messages. Additionally or alternatively, the sentiment and context model 406 may determine a context of the key words and/or the entire content of the A2P 418 in order to more accurately determine the sentiment and/or context of the A2P 418. For example, the sentiment and context model 406 may identify that certain words, in the context of the content of the A2P 418, are used to potentially harass the intended recipient of the A2P 418, and therefore that the A2P 418 is likely an illegitimate message. Thus, the sentiment and context model 406 may then generate the score 430, indicating that the A2P 518 is likely an illegitimate message. The score 430 may then be transmitted to another component, such as the combinatory model 212 in FIG. 2.

Figure 5:
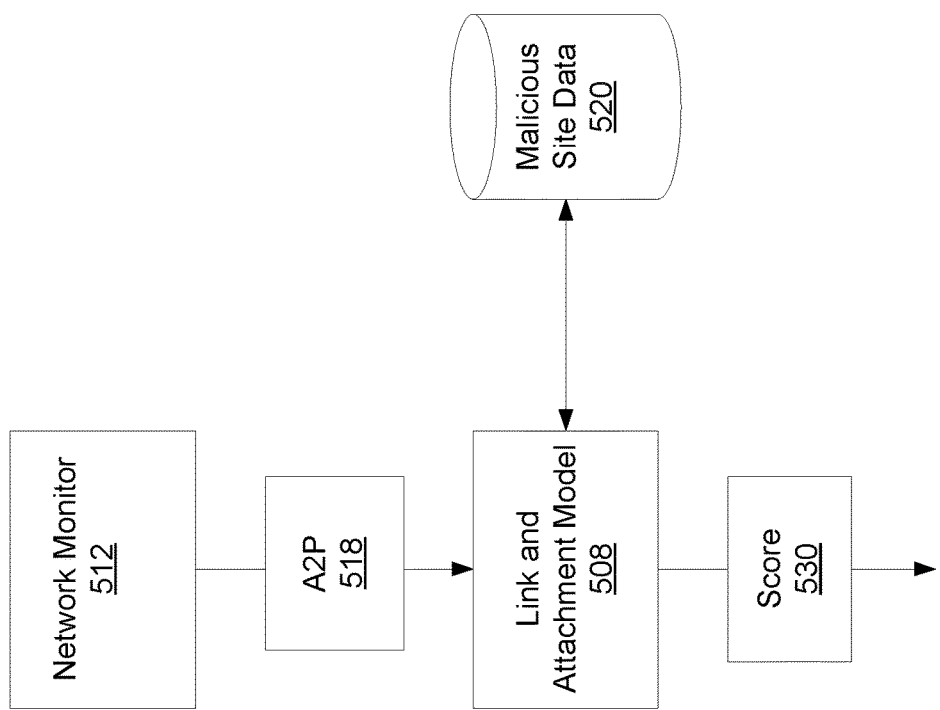
FIG. 5 illustrates a system for analyzing links and attachments in A2P messages, according to certain embodiments.

FIG. 5 illustrates a system 500 for analyzing links and attachments in A2P messages, according to certain embodiments. The system 500 may work separately from or in conjunction with the systems 300 and/or 400, described in FIGS. 3 and 4, respectively. The system 500 may include a link and attachment model 508, a network monitor 512, and malicious site data 520. Some or all of the components of the system 500 may be implemented on a single computer system (e.g., the computing system 102) or may be implemented on separate computer systems. The network monitor 512 may be similar to the network monitor 104. Thus, the network monitor 512 may be configured to monitor some or all network traffic on a network. The network monitor 512 may monitor one or more routes or pathways, through which various types of traffic may enter and be transmitted through the network. For example, the network monitor 512 may intercept A2Ps (e.g. an A2P 518) as they enter the network. The network monitor 512 may intercept a portion of the A2Ps sent through the network or may intercept all A2Ps. In other words, the network monitor may be a part of a typical route for A2P traffic through the network.

The link and attachment model 508 may include machine learning models for deep learning-based anomaly detection such as convolutional neural networks (CNNs), etc. The link and attachment model 508 may include one or more rules-based models that compare information from an A2P message to known databases. The link and attachment model 508 may be trained on the malicious site data 520. The malicious site data 520 may be included on a database such as the database 108. The malicious site data 520 may be included in a larger dataset on the database and/or may be a separate dataset. The malicious site data 520 may include data associated with known malicious sites such as IP addresses, images typical of malicious sites, etc. The malicious site data 520 may be generated by a separate system configured to scan webpages, databases, and other sources for known malicious websites and links. For example, an online learning algorithm may determine new characteristics of new illegitimate message and update the malicious site data 520. The malicious site data 520 may additionally or alternatively be a publicly available and updated dataset. Thus, the link and attachment model 508 may be trained to identify features and characteristics (e.g., text, addresses, images, etc.) associated with malicious sites.

The network monitor 512 may provide the A2P 518 to the link and attachment model 508. The A2P 518 may include a message content type, location and routing data, a sender ID, a link and/or attachment, and other such data. The A2P 518 may be intercepted by the network monitor 512 upon being received by the network (e.g., the network 119). The link and attachment model 508 may then analyze one or more characteristics of the A2P 518. For example, the link and attachment model 508 may analyze a link and/or attachment included in the A2P 518. In an example, the link may be a known link used in spam messages, phishing messages, or other illegitimate messages. The link and attachment model 508 may then identify the link as the known link using a rules-based model and determine that the A2P 518 is likely an illegitimate message. In another example, the A2P 518 may identify a website associated with the link included in the A2P 518. The website may not be included in the malicious site data 520. Because the link and attachment model 508 may be trained to identify features of malicious sites, the link and attachment model 508 may determine that the website is likely malicious and that the A2P is likely an illegitimate message. In yet another example, the link and attachment model 508 may identify features in the attachment that are common to malicious attachments and identify that the A2P 518 is likely an illegitimate message. If the link and attachment model 508 determines that the A2P 518 is likely a malicious message, the link and attachment model 508 may generate the score 530, indicating that the A2P 518 is likely an illegitimate message. The score 530 may then be transmitted to another component, such as the combinatory model 212 in FIG. 2.

Figure 6:
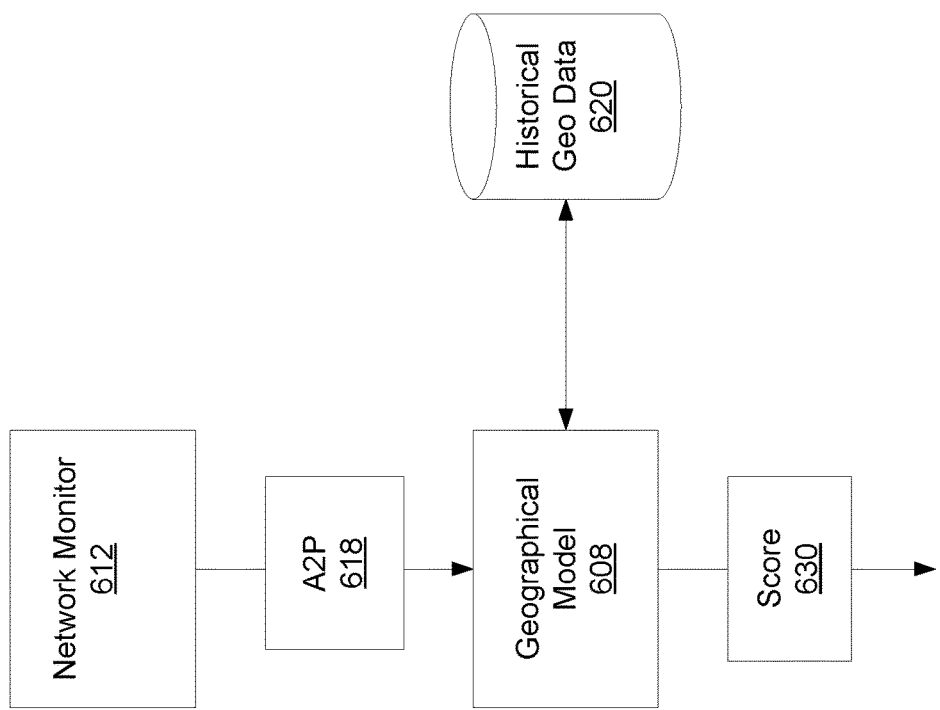
FIG. 6 illustrates a system for analyzing geographic data of an A2P message, according to certain embodiments.

FIG. 6 illustrates a system 600 for analyzing geographic data of an A2P message, according to certain embodiments. The system 500 may work separately from or in conjunction with the systems 300, 400, and/or 500, described in FIGS. 3, 4, and 5, respectively. The system 600 may include a geographical model 610, a network monitor 612, and historical geographical data 620. Some or all of the components of the system 600 may be implemented on a single computer system (e.g., the computing system 102) or may be implemented on separate computer systems. The network monitor 612 may be similar to the network monitor 104. Thus, the network monitor 612 may be configured to monitor some or all network traffic on a network. The network monitor 612 may monitor one or more routes or pathways, through which various types of traffic may enter and be transmitted through the network. For example, the network monitor 612 may intercept A2Ps (e.g. an A2P 618) as they enter the network. The network monitor 612 may intercept a portion of the A2Ps sent through the network or may intercept all A2Ps. In other words, the network monitor may be a part of a typical route for A2P traffic through the network.

The geographical model 610 may include clustering algorithms (e.g., K-Means, Density based spatial clustering with noise, and/or other clustering algorithms, a GIS, one or more geostatistical models, and/or other suitable models. The geographical model 610 may be trained on historical geographical data 620. The historical geographical data 620 may be included on a database such as the database 108. The historical geographical data 620 may be included in a larger dataset on the database and/or may be a separate dataset. The historical geographical data 620 include information such as IP addresses, country codes, other identifiers that may be associated with illegitimate messages. For example, certain countries may be associated with illegitimate messages (meaning some percentage of illegitimate messages may originate or be transmitted from the country). The historical geographical data 620 may also include information associated with a sender ID of the A2P 618. The historical geographical data 620 may include information that indicates typical routes and lengths (e.g., how many and which countries/nodes an A2P is routed through). For example, the historical geographical data 620 may include data that indicates that the particular sender typically sends A2P messages from the United States. Thus, the geographical model 610 may be trained to identify routes, route lengths, and other geographical characteristics of the A2P 618 that are associated with illegitimate messages.

The network monitor 612 may provide the A2P 618 to the geographical model 610. The A2P 618 may include a message content type, location and routing data, a sender ID, a link and/or attachment, and other such data. The A2P 618 may be intercepted by the network monitor 612 upon being received by the network (e.g., the network 119). The geographical model 610 may then analyze one or more characteristics (e.g., geographical characteristics) of the A2P 618. For example, the geographical characteristics of the A2P 618 may indicate that the A2P 618 originated from a particular country. An intended recipient of the A2P 618 may have never received an A2P message from the particular country and/or the sender ID may not transmit A2P messages from the particular country. The geographical model 610 may then determine that the A2P 618 is likely an illegitimate message. In another example, the geographical model 610 may determine that the route used to transmit the A2P 618 is different than the typical route used by the sender ID. In yet another example, the geographical model 610 may determine that the A2P 618 was transmitted via one or more locations and/or IP addresses commonly used with gray-routed and/or illegitimate messages. If the geographical model 610 determines that the A2P 618 is likely a malicious message, the geographical model 610 may generate the score 630, indicating that the A2P 618 is likely an illegitimate message. The score 630 may then be transmitted to another component, such as the combinatory model 212 in FIG. 2.

Figure 7:
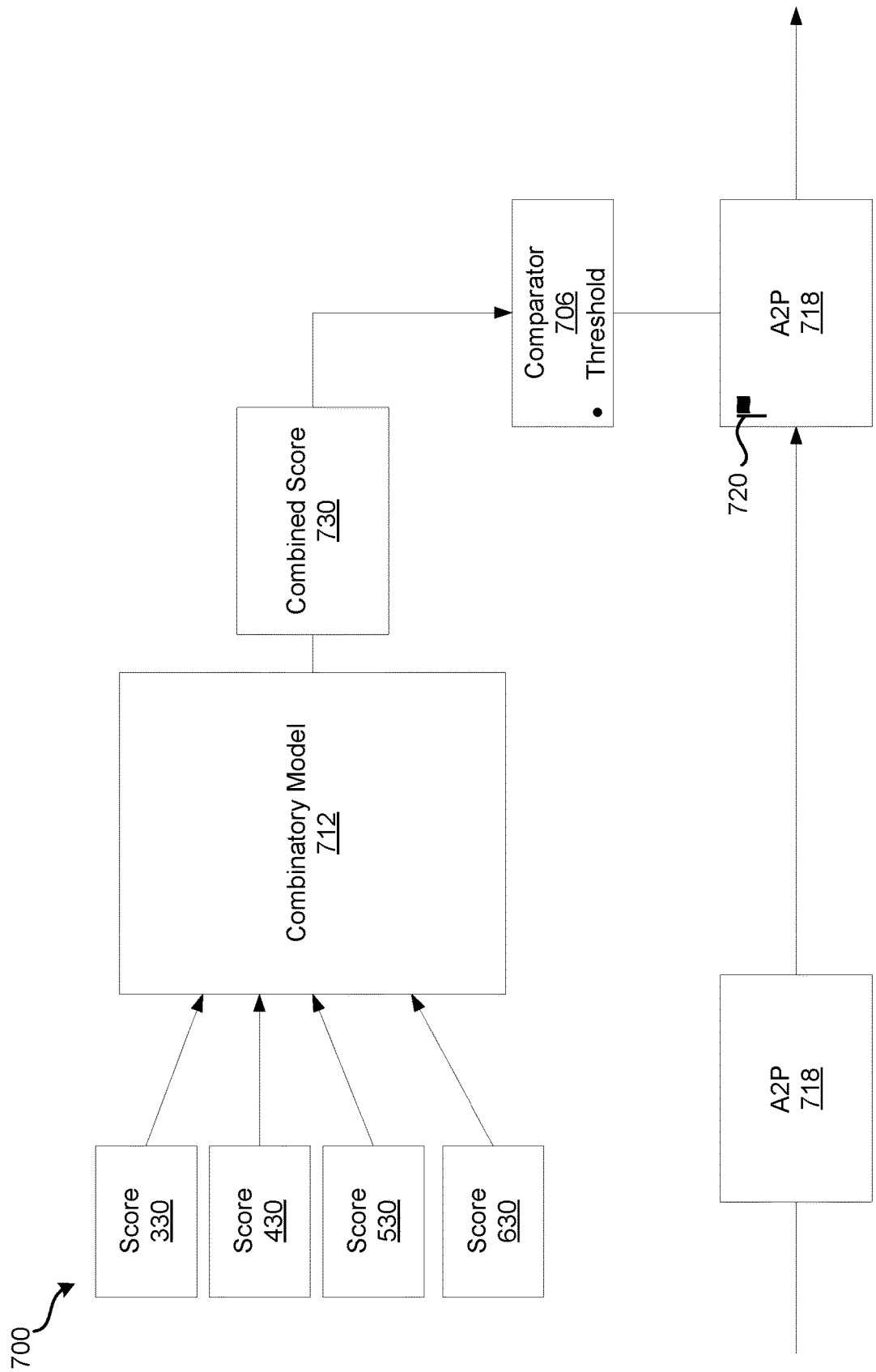
FIG. 7 illustrates a system for generating a combined score for A2P messages, according to certain embodiments.

FIG. 7 illustrates a system 700 for generating a combined score for A2P messages, according to certain embodiments. The system 700 may be implemented as part of a computing system such as the computing system 102 in FIG. 1. The system 700 may be a component of a machine learning module, similar to the MLM 202 in FIG. 2. The system 700 may work separately from or in conjunction with the systems 300, 400, 500, and/or 600, described in FIGS. 3, 4, 5, and 6, respectively. Thus, the system 700 may be implemented on the same computing system as the systems 300-600 or may be implemented on a different computing system. The system 700 may include a combinatory model 712 and a comparator 706. The combinatory model 712 may be similar to the combinatory model 212.

The combinatory model 712 may include neural networks such as RNNs, Deep-learning neural networks, modular neural networks, and other suitable neural networks. The combinatory model 712 may also include other types of machine learning models. The combinatory model 712 may be trained at least in part on user feedback provided by users and/or senders of A2P messages (e.g., the A2P 118, the sender 110, and sender ID 112 in FIG. 1). The combinatory model 712 may also be trained using one or more datasets, as may be included in the database 108. For example, the combinatory model 712 may be trained using some or all of the historical network data 320, the language data 420, the malicious site data 520, and/or the historical geographical data 620. Some or all of the dataset(s) used to train the combinatory model 712 may be annotated using the user feedback. In some embodiments, the datasets may include data from a sender and/or sender ID indicating one or more characteristics to be whitelisted (e.g., geographical data). The annotation may cause the combinatory model 712 to generate weights associated with respective scores received from other models (e.g., the models 204-210). Thus, the combinatory model 712 may be trained to combine the respective score received from the models and generate a combined score 730.

The comparator 706 may be included in the machine learning module or may be a separate component of a computing system. The computing system may be the same computing system used to implement the combinatory model or may a different computing system. The comparator 706 may include a predetermined threshold. The predetermined threshold may be a confidence interval, representing a likelihood that an A2P message is an illegitimate message. For example, the predetermined threshold may be 0.8 (i.e., 80% confidence that the A2P message is an illegitimate message). If the combined score 730 is greater than 0.8, the A2P message may be flagged as illegitimate. In some embodiments, the comparator may include multiple predetermined thresholds. For example, a first threshold may be 0.5. If a combined score for a particular A2P message is 0.5 or greater, the comparator may cause the particular A2P to be flagged as likely to be illegitimate, but still deliver the A2P to an intended recipient. A second threshold may be 0.9. If the combined score for the particular A2P message is greater than 0.9, the particular A2P message may be flagged as likely illegitimate and filtered such that the particular A2P message does not reach its intended recipient.

The combinatory model 712 may receive one or more respective scores 330-630 from the behavior model 304, the sentiment and context model 406, the link and attachment model 508, and/or the geographical model 610 in FIGS. 3-6, respectively. Each of the respective scores 330-630 may include a confidence interval. The confidence interval may be a number, a decimal, a fraction, a point on some scale (e.g., 3 out of 7), or any other suitable representation. Each of the respective scores 330-630 may represent a likelihood that an A2P 718 is an illegitimate message based on the characteristics analyzed by each respective model. For example, the behavior model 304 may determine that the A2P 718 is an A2P message that is included in an unusual spike in a volume of message transmitted by an associated sender ID. The respective score 330 may therefore include a confidence interval of 0.7 (e.g., 70% confident that the A2P 718 is illegitimate). The sentiment and context model 406 may determine that the content of the A2P 718 includes a request for a password reset and the associated sender ID typically transmits bank related messages (e.g., OTP requests). The respective score 430 may therefore include a confidence interval of 0.5. The link and attachment model 508 may determine that a link included in the A2P 718 is not included in the malicious site data 520, but the link and/or a website associated with the link shares features with known phishing sites. The respective score 530 may therefore include a confidence interval of 0.8. The geographical model 610 may determine that a route used to transmit the A2P 718 is different from a route typically used by the particular sender associated with the A2P 718. The respective score 630 may therefore include a confidence interval of 0.8.

The combinatory model 712 may analyze each of the respective scores 330-630 based on the weight assigned to each respective score 330-630 (and/or the associated models). The weights may be predetermined or may be dynamic. For example, the weights assigned to each respective score 330-630 may be based, at least in part, on the weights of the other respective scores 330-630. If the respective score 430 is above a threshold (e.g., the A2P 718 is likely to be illegitimate based on the content of the A2P message), the respective score 430 may be assigned a higher than average weight (e.g., a weight of 2, where 1 would be a normal weight). Then, the respective score 330 may be given a weight of 0.5, meaning that the particular network traffic characteristics of the message 718 may not be as important. The respective score 630 may then be given a weight of 1.25, meaning that the geographical characteristics of the A2P 718 are more important than average. Thus, the weights of each of the respective scores 330-630 may be dependent on each of the respective scores 330-630. The weights may be assigned based on comparing thresholds to each of the respective scores 330-630 (as described in the example above), calculated based on a function (linear or non-linear), or by any other suitable method. The weights used by the combinatory model 712 may be adjusted in real-time based on use feedback and/or updated datasets.

The combinatory model 712 may generate a combined score 730 for the A2P 718 based on the respective scores 330-630. The combined score 730 may then be provided to the comparator 706. The comparator 706 may compare the combined score 730 to a predetermined threshold. If the combined score 730 is higher than the predetermined threshold, the comparator 706 may cause a flag 720 to be indicated generated for the A2P 718. The flag 720 may be an annotation within the data of the A2P 718, a warning to a recipient, a warning to a sender and/or the sender ID, and/or any other suitable type of indication. Based on the flag 720, the A2P 718 may be transmitted to the intended recipient or filtered such that the A2P 718 does not reach the intended recipient. The combined score 730 and/or the A2P 718 may also be provided to a database 108 to be included in one or more datasets. The one or more datasets may be used to retrain the models (e.g., the models 204-210) and/or the combinatory model. The combined score 730 and/or the A2P 718 may additionally or alternatively be provided to a contextually based filtering system.

Figure 8:
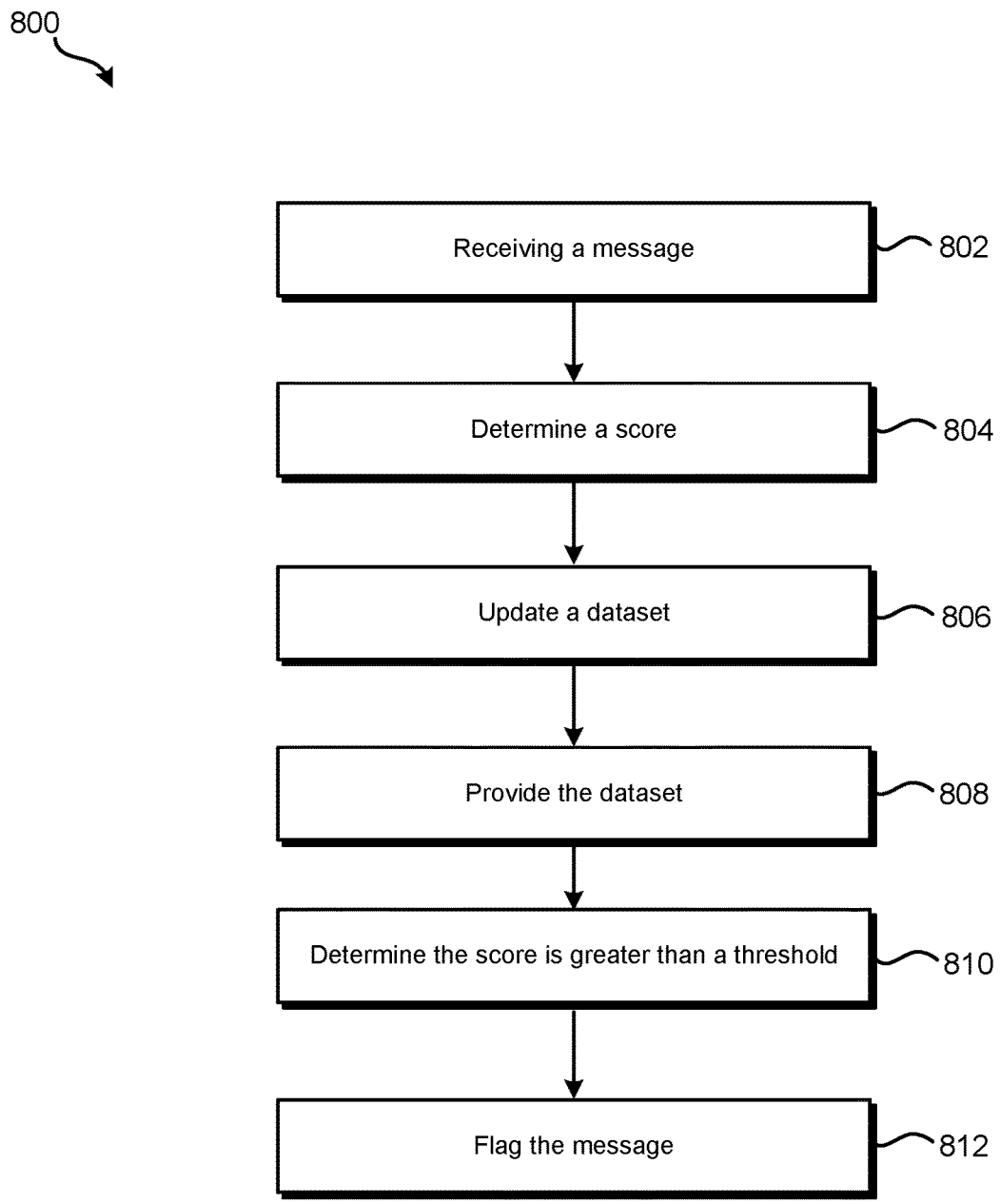
FIG. 8 illustrates a flowchart of a method for flagging messages, according to certain embodiments.

FIG. 8 illustrates a flowchart of a method 800 for flagging messages, according to certain embodiments. The method 800 may be performed by some or all of the systems and devices described herein. For example, the method 800 may be performed by some or all of the systems 100-700 in FIGS. 1-7 operating separately or together. The steps of the method 800 may be performed in a different order than is described and/or may be combined with other steps. In some embodiments, some steps may be skipped altogether.

At step 802, the method 800 may include receiving, by a computing system, a message. The message may be an A2P message such as the A2P 118. The computing system may be similar to the computing system 102. The computing system 102 may be a cloud-based computing system, including one or more physical or virtual computing devices. The message may be received via a network associated with a 5G wireless provider. The network may be an open-radio access network (O-RAN), implemented on a cloud-based architecture to provide wireless cellular service (e.g., 5G cell service) to a UE. In some embodiments, the computing system may perform the following steps in or near real-time.

At step 804, the method 800 may include determining, by the computing system and utilizing at least one machine learning model, a score for the message based at least in part on one or more characteristics of the message. The score may represent a likelihood that the message is an illegitimate message. The at least one machine learning model may be included in a machine learning module, such as the MLM 202 in FIG. 2. The machine learning module may include a behavioral model (e.g., the behavioral model 304 in FIG. 3), a sentiment and context (e.g., the sentiment and context model 406 in FIG. 4), a link and attachment model (e.g., the link and attachment model 508 in FIG. 5), a geographical model (e.g., the geographical model 610 in FIG. 6), a combinatory model (e.g., the combinatory model 712 in FIG. 7), and other models for analyzing characteristics of the message.

The score may be a combined score based on respective scores from the at least one machine learning model (e.g., the combined score 730). The respective scores may be weighted. The weights of the respective scores may be predetermined and static, or may be dynamic weights, based on the respective scores themselves.

At step 806, the method 800 may include updating, by the computing system, a database to include the message, the score, and/or the one or more characteristics associated with the message. The database may be similar to the database 108 and include one or more datasets. The datasets may include some or all of the message, the score and/or the one or more characteristics associated with the message.

At step 808, the method 800 may include providing, by the computing system, at least a portion of data on the database to the at least one machine learning model. The at least one machine learning model may be retrained using the message, the score, and or the one or more characteristics. For example, the computing system may include a machine learning module such as the MLM 202. The database may include datasets such as the historical network data 320, the language 420, the malicious site data 520, and the historical geographical data 620. The datasets may also include user feedback, received from intended recipients of the message and/or a sender ID associated with the message. The datasets may then be used to retrain some or all of the machine learning models included in the MLM.

At step 810, the method 800 may include determining, by the computing system, that the score is greater than a predetermined threshold. The predetermined threshold may be a confidence interval, representing a likelihood that the message is an illegitimate message. For example, the predetermined threshold may be 0.8 (i.e., 80% confidence that the message is an illegitimate message). If the score is greater than 0.8, the message may be flagged as illegitimate. In some embodiments, a computing system may utilize multiple predetermined thresholds. For example, a first threshold may be 0.5. If a score for a particular message is 0.5 or greater, the computing system may cause the particular message to be flagged as likely to be illegitimate, but still deliver the message to an intended recipient. A second threshold may be 0.9. If the score for the particular message is greater than 0.9, the particular message may be flagged as likely illegitimate and filtered such that the particular message does not reach its intended recipient.

In in response to determining that the score is greater than the predetermined threshold, the method 800 may include flagging, by the computing system, the message as an illegitimate message. The flag may be an annotation within the data of the message, a warning to a recipient, a warning to the sender and/or the sender ID, and/or any other suitable type of indication. In some embodiments, the message may be filtered and not delivered to intended recipients, based at least in part to the flag. In other embodiments, the message may be delivered as expected.

In some embodiments, the computing system may transmit at least one of the message, the one or more characteristics, or the score to a contextual based filtering system. The contextual based filtering system may analyze messages to generate a contextual view of illegitimate messages received via the network. The contextual based filtering system may be part of the computing system and/or may be part of a different system. An output of the contextual filtering system may be provided to the database and used to retrain the at least one machine learning model.

In some embodiments, the method 800 may include determining, by the computing system, sender data associated with a sender of the message. The method 800 may include determining, by the computing system, sender data associated with a sender of the message. The method 800 may include accessing, by the computing system, a database comprising historical network data associated with historical illegitimate messages. The method 80 may also include determining, by the computing device and using a rules-based model, that the sender data corresponds to the historical network data associated with historical illegitimate messages.

In some embodiments, the method 800 may further include receiving, by the computing system, data from a sender associated with the message indicating one or more characteristics to be whitelisted. The method 800 may then include updating, by the computing system, the database to include the one or more characteristics to be whitelisted.

Figure 9A:
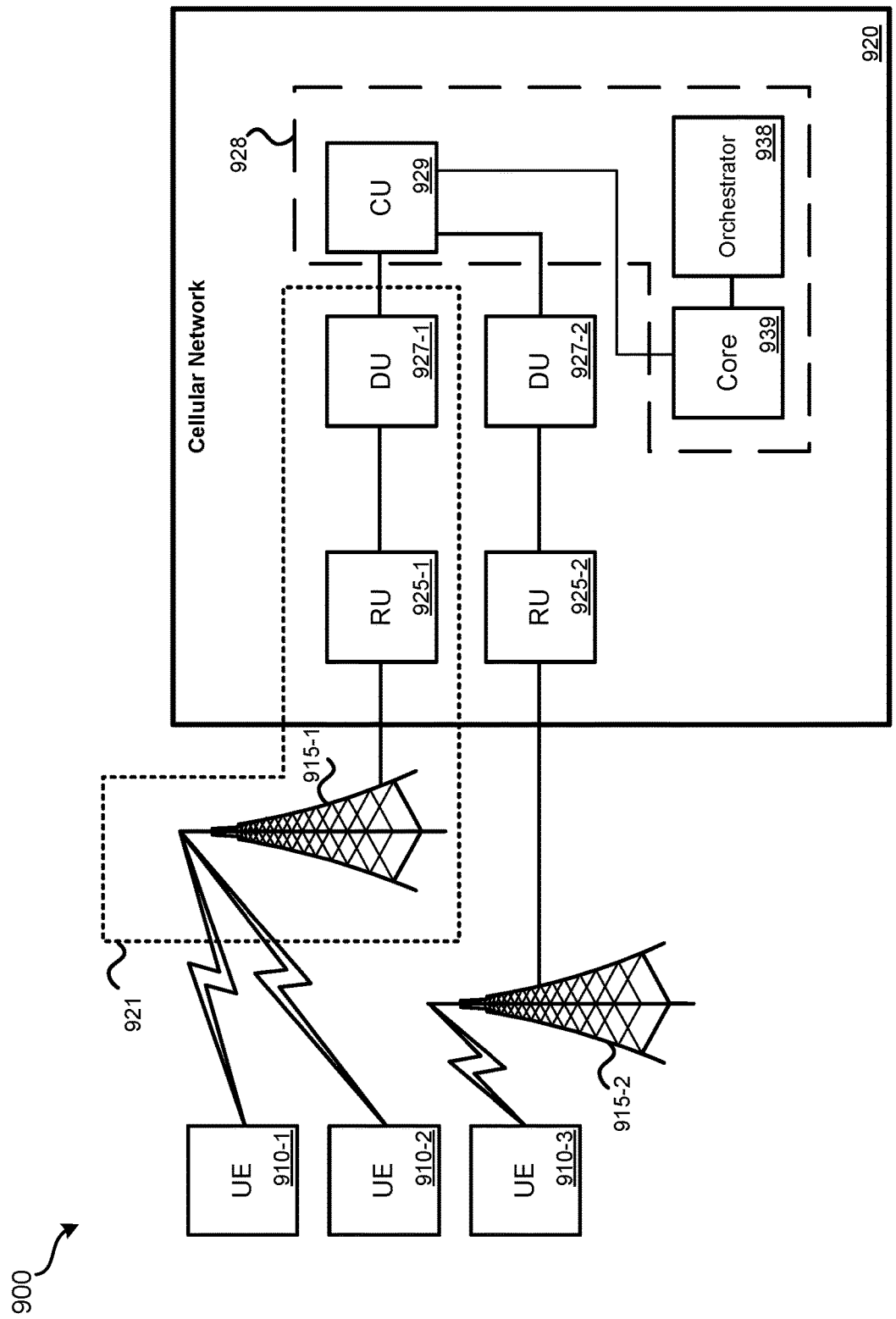
FIG. 9A illustrates an embodiment of a cellular network system, according to certain embodiments.

FIG. 9A illustrates an embodiment of a cellular network system 900 ("system 900"), according to certain embodiments. System 900 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 900 can include: UE 910 (UE 910-1, UE 910-2, UE 910-3); base station 915; cellular network 920; radio units 925 ("RUs 925"); distributed units 927 ("DUs 927"); centralized unit 929 ("CU 929"); core 939, and orchestrator 938. FIG. 9A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 10.

UE 910 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5G) interface, such as a 5G modem. Examples include sensor devices, Internet of Things (IoT) devices, manufacturing robots; unmanned aerial (or land-based) vehicles, network-connected vehicles, environmental sensors, etc. UE 910 may use RF to communicate with various base stations of cellular network 920. Two base stations 915 (BS 915-1, 915-2) are illustrated. Real-world implementations of system 900 can include many (e.g., hundreds, thousands) base stations, and many RUs, DUs, and CUs. BS 915 can include one or more antennas that allow RUs 925 to communicate wirelessly with UEs 910. RUs 925 can represent an edge of cellular network 920 where data is transitioned to wireless communication. In some implementations, the radio access technology (RAT) used by RU 925 is 5G New Radio (NR). Other implementations use other RAT, such as 4G Long Term Evolution (LTE). The remainder of cellular network 920 may be based on an exclusive 5G architecture, a hybrid 4G/5G architecture, a 4G architecture, or some other cellular network architecture. Base station equipment 921 may include an RU (e.g., RU 925-1) and a DU (e.g., DU 927-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 925-1, may communicate with DU 927-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 927-1, may communicate with CU 929. Collectively, RUs, DUs, and CUs create a gNodeB, which serves as the radio access network (RAN) of cellular network 920. CU 929 can communicate with core 939. The specific architecture of cellular network 920 can vary by embodiment. Edge cloud server systems outside of cellular network 920 may communicate, either directly, via the Internet, or via some other network, with components of cellular network 920. For example, one or more DUs 927-1 may be able to communicate with an edge cloud server system without routing data through CU 929 or core 939.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 9B:
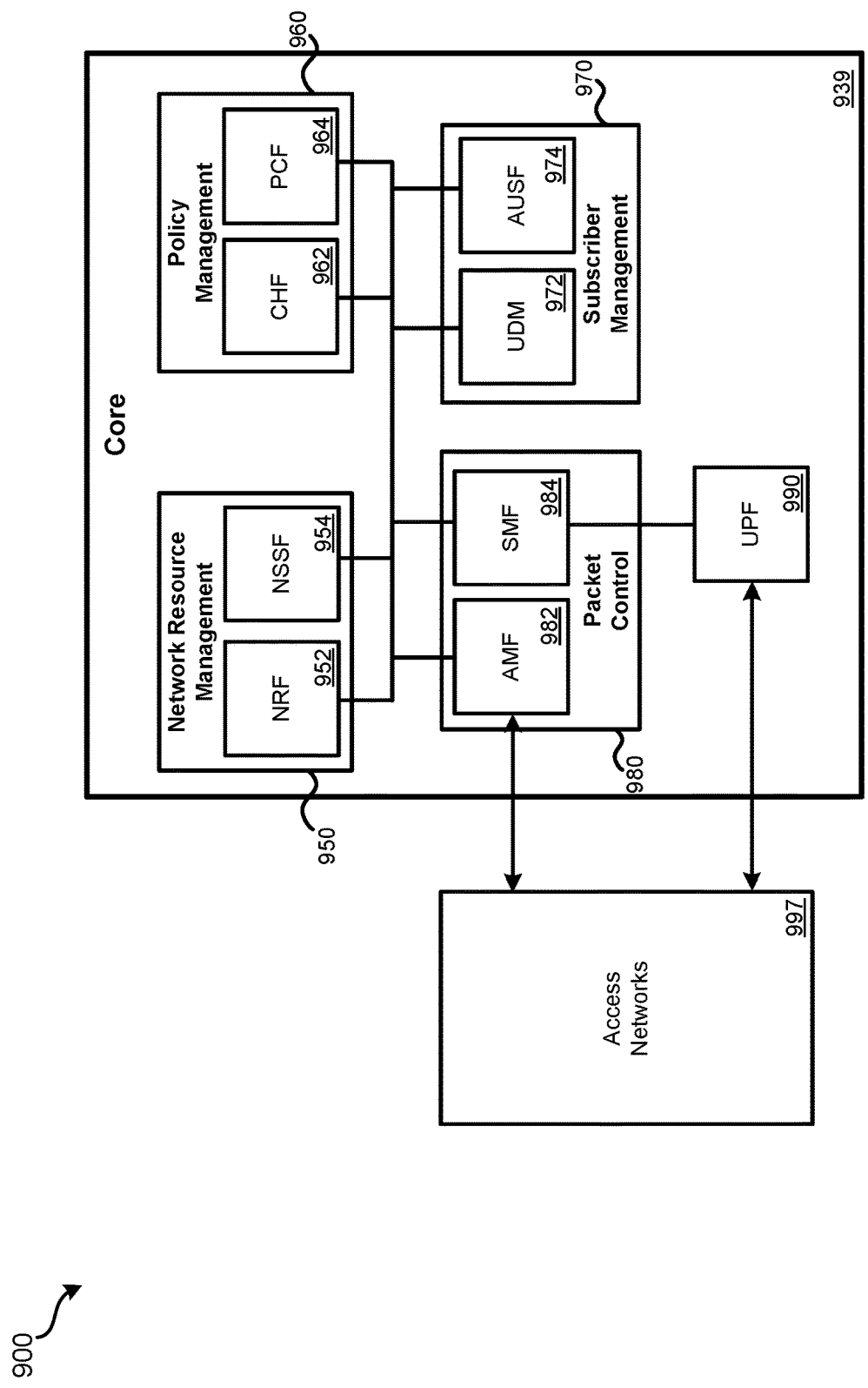
FIG. 9B illustrates an exemplary core, according to certain embodiments.

Further detail regarding exemplary core 939 is provided in relation to FIG. 9B. FIG. 9B illustrates an exemplary core 939, according to certain embodiments. The exemplary core 939 can be physically distributed across data centers or located at a central national data center (NDC), such as detailed in relation to FIG. 10, can perform various core functions of the cellular network. Core 939 can include: network resource management components 950; policy management components 960; subscriber management components 970; and packet control components 980. Individual components may communicate via a bus, thus allowing various components of core 939 to communicate with each other directly. Core 939 is simplified to show some key components. Implementations can involve additional components.

Network resource management components 950 can include: Network Repository Function (NRF) 952 and Network Slice Selection Function (NSSF) 954. NRF 952 can allow 5G network functions (NFs) to register and discover each other via a standards-based application programming interface (API). NSSF 954 can be used by AMF 982 to assist with the selection of a network slice that will serve a particular UE (e.g., UEs 910 of FIG. 9A).

Policy management components 960 can include: Charging Function (CHF) 962 and Policy Control Function (PCF) 964. CHF 962 allows charging services to be offered to authorized network functions. Converged online and offline charging can be supported. PCF 964 allows for policy control functions and the related 5G signaling interfaces to be supported.

Subscriber management components 970 can include: Unified Data Management (UDM) 972 and Authentication Server Function (AUSF) 974. UDM 972 can allow for generation of authentication vectors, user identification handling, NF registration management, and retrieval of UE individual subscription data for slice selection. AUSF 974 performs authentication with UEs.

Packet control components 980 can include: Access and Mobility Management Function (AMF) 982 and Session Management Function (SMF) 984. AMF 982 can receive connection- and session-related information from UEs and is responsible for handling connection and mobility management tasks. SMF 984 is responsible for interacting with the decoupled data plane, creating updating and removing Protocol Data Unit (PDU) sessions, and managing session context with the User Plane Function (UPF).

User plane function (UPF) 990 can be responsible for packet routing and forwarding, packet inspection, quality of service (QOS) handling, and external PDU sessions for interconnecting with a Data Network (DN) (e.g., the Internet) or various access networks 997. Access networks 997 can include the RAN of cellular network 920 of FIG. 9A.

While FIGS. 9A and 9B illustrate various components of cellular network 920, it should be understood that other embodiments of cellular network 920 can vary the arrangement, communication paths, and specific components of cellular network 920. While RU 925 may include specialized radio access componentry to enable wireless communication with UE 910, other components of cellular network 920 may be implemented using either specialized hardware, specialized firmware, and/or specialized software executed on a general-purpose server system. In a virtualized arrangement, specialized software on general-purpose hardware may be used to perform the functions of components such as DU 927, CU 929, and core 939. Functionality of such components can be co-located or located at disparate physical server systems. For example, certain components of core 939 may be co-located with components of CU 929.

Returning to FIG. 9A, some O-RAN implementations of the DUs 927, CU 929, core 939, and/or orchestrator 938 are implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 900, cloud-based cellular network components A128 include CU 929, core 939, and orchestrator 938. In some embodiments, DUs 927 may be partially or fully added to cloud-based cellular network components 928. Such cloud-based cellular network components 928 may be executed as specialized software executed by underlying general-purpose computer servers. Cloud-based cellular network components 928 may be executed on a public third-party cloud-based computing platform or a cloud-based computing platform operated by the same entity that operates the RAN. A cloud-based computing platform may have the ability to devote additional hardware resources to cloud-based cellular network components 928 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits, as needed, for the cellular network 920 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 938. Orchestrator 938 can represent various software processes executed by underlying computer hardware. Orchestrator 938 can monitor cellular network 920 and determine the amount and location at which cellular network functions should be deployed to meet or attempt to meet service level agreements (SLAs) across slices of the cellular network.

Orchestrator 938 can allow for the instantiation of new cloud-based components of cellular network 920. As an example, to instantiate a new DU, orchestrator 938 can perform a pipeline of calling the DU code from a software repository incorporated as part of, or separate from, cellular network 920; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 920. Cellular network 920 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 925-1 and DU 927-1; and a second set of network slices, which may only partially overlap or may be wholly different from the first set, may be reserved at RU 925-2 and DU 927-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 9A, UE 910 may be operating on one or more production slices of cellular network 920. As detailed later in this document, a UE that functions on a particular entity's local network may be assigned to a slice particular to the entity or a slice that provides a particular QoE for tasks to be performed by the entity's UE.

Components such as DUs 927, CU 929, orchestrator 938, and core 939 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 10:
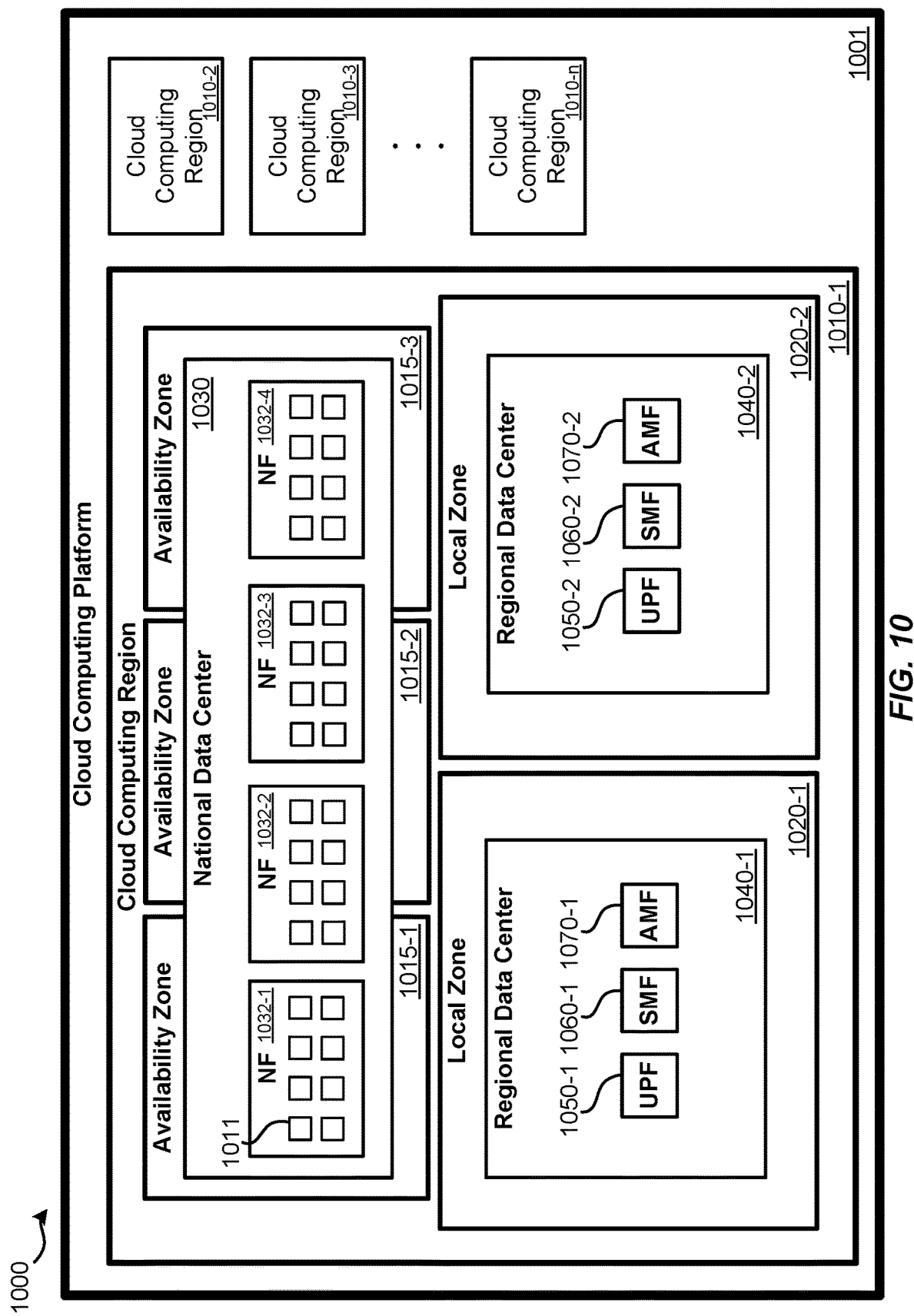
FIG. 10 illustrates an embodiment of a cellular network core network topology as implemented on a public cloud-computing platform, according to certain embodiments.

FIG. 10 illustrates an embodiment of a cellular network core network topology 1000 as implemented on a public cloud-computing platform, according to certain embodiments. The cellular network core network topology 1000 can be an implementation of the core 939 of FIGS. 9A and/or 9B. Cellular network core network topology 1000 can represent how logical cellular network groups are distributed across cloud computing infrastructure of cloud computing platform 1001. Cloud computing platform 1001 can be logically and physically divided up into various different cloud computing regions 1010. Each of cloud computing regions 1010 can be isolated from other cloud computing regions to help provide fault tolerance, fail-over, load-balancing, and/or stability and each of cloud computing regions 1010 can be composed of multiple availability zones, each of which can be a separate data center located in general proximity to each other (e.g., within 600 miles). Further, each of cloud computing regions 1010 may provide superior service to a particular geographic region based on physical proximity. For example, cloud computing region 1010-1 may have its datacenters and hardware located in the northeast of the United States while cloud computing region 1010-2 may have its datacenters and hardware located in California. For simplicity, the details of the cellular network as executed in only cloud computing region 1010-1 is illustrated. Similar components may be executed in other cloud computing regions of cloud computing regions 1010 (1010-2, 1010-3, 1010-*n*).

In other embodiments, cloud computing platform 1001 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 1010 may include multiple availability zones 1015. Each of availability zones 1015 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 1015. For example, a database that is maintained as part of NDC 1030 may be replicated across availability zones 1015; therefore, if an availability zone of the cloud computing region is unavailable, a copy of the database remains up-to-date and available, thus allowing for continuous or near continuous functionality.

On a (e.g., public) cloud computing platform, cloud computing region 1010-1 may include the ability to use a different type of data center or group of data centers, which can be referred to as local zones 1020. For instance, a client, such as a provider of the hybrid cloud cellular network, can select from more options of the computing resources that can be reserved at an availability zone 1015 compared to a local zone 1020. However, a local zone 1020 may provide computing resources nearby geographic locations where an availability zone 1015 is not available. Therefore, to provide low latency, certain network components, such as regional data centers 1040, can be implemented at local zones 1020 rather than availability zones 1015. In some circumstances, a geographic region can have both a local zone 1020 and an availability zone 1015.

In the topology of a 5G NR cellular network, 5G core functions of core 939 can logically reside as part of a national data center (NDC) 1030. NDC 1030 can be understood as having its functionality existing in cloud computing region 1010-1 across multiple availability zones 1015. At NDC 1030, various network functions, such as NFs 1032, are executed. For illustrative purposes, each NF 1032, whether at NDC 1030 or elsewhere located, can be comprised of multiple sub-components, referred to as pods (e.g., pod 1011) that are each executed as a separate process by the cloud computing region 1010. The illustrated number of pods 1011 is merely an example; fewer or greater numbers of pods 1011 may be part of the respective 5G core functions. It should be understood that in a real-world implementation, a cellular network core, whether for 5G or some other standard, can include many more network functions. By distributing NFs 1032 across availability zones 1015, load-balancing, redundancy, and fail-over can be achieved. In local zones 1020, multiple regional data centers 1040 can be logically present. Each of regional data centers 1040 may execute 5G core functions for a different geographic region or group of RAN components. As an example, 5G core components that can be executed within an RDC, such as RDC 1040-1, may be: UPFs 1050, SMFs 1060, and AMFs 1070. While instances of UPFs 1050 and SMFs 1060 may be executed in local zones 1020, SMFs 1060 may be executed across multiple local zones 1020 for redundancy, processing load-balancing, and fail-over.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, executing instructions stored in the non-transitory computer-readable medium causes the processors to perform steps of methods and/or to implement features of components described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for filtering an illegitimate message, comprising:
   receiving, by a computing system of a wireless network provider, a message;
   generating, by a machine learning module of the computing system, a combined score indicating a confidence interval that the message is illegitimate, the machine learning module comprising:
      a link and attachment model configured to analyze a link and/or an attachment in the message and generate a first score indicating a likelihood that the message is illegitimate based on the link and/or the attachment;
      a behavioral model configured to analyze data associated with the message and generate a second score indicating a likelihood that the message is illegitimate based on the data associated with the message;
      a geographical model configured to analyze geographical-metadata associated with the message and generate a third score indicating a likelihood that the message is illegitimate based on the geographical-metadata; and
      a combinatory model configured to generate a combined score based on the first score, the second score, and the third score, wherein each of the first score, the second score, and the third score are dynamically weighted;
   updating, by the computing system, a database to include the message, the first score, the second score, the third score, and/or the combined score;
   providing, by the computing system, at least a portion of data on the database to the machine learning module such that the combinatory model is retrained using at least one of the message or the combined score;
   determining, by the computing system, that the combined score is greater than a predetermined threshold;
   inserting, by the computing system, an annotation within data of the message flagging the message as an illegitimate message; and
   causing, by a contextual filtering system of the computing system, the illegitimate message to be filtered by the wireless network provider.

2. The method of claim 1, wherein the computing system determines the combined score within a time window of between 0.5-1 second, inclusive.

3. The method of claim 1, wherein the behavioral model analyzes the data comprising at least one of a time window, message type, or message volume.

4. The method of claim 1, wherein the link and attachment model analyzes at least one of an IP address, text, or images associated with the link and/or the attachment.

5. The method of claim 1, wherein the geographical model analyzes the geographical metadata comprising at least one of IP addresses, country codes, or a route length of the message.

6. The method of claim 1, further comprising:
   determining, by the computing system, sender data associated with a sender of the message;

accessing, by the computing system, a database comprising historical network data associated with historical illegitimate messages; and determining, by the computing system and using a rules-based model, that the sender data corresponds to the historical network data associated with historical illegitimate messages.

7. A system, comprising:
one or more processors;
a machine learning module, comprising:
a computer-readable medium comprising instructions that, when executed by the one or more processors, cause the system to perform operations to:
receiving, by a computing system of a wireless network provider, a message;
generating, by a machine learning module of the computing system, a combined score indicating a confidence interval that the message is illegitimate, the machine learning module comprising:
a link and attachment model configured to analyze a link and/or an attachment in the message and generate a first score indicating a likelihood that the message is illegitimate based on the link and/or the attachment;
a behavioral model configured to analyze data associated with the message and generate a second score indicating a likelihood that the message is illegitimate based on the data associated with the message;
a geographical model configured to analyze geographical-metadata associated with the message and generate a third score indicating a likelihood that the message is illegitimate based on the geographical-metadata; and
a combinatory model configured to generate a combined score based on the first score, the second score, or and the third score, wherein each of the first score, the second score, and the third score are dynamically weighted;
updating, by the computing system, a database to include the message, the first score, the second score, the third score, and/or the combined score;
providing, by the computing system, at least a portion of data on the database to the machine learning module such that the combinatory model is retrained using at least one of the message or the combined score;
determining, by the computing system, that the combined score is greater than a predetermined threshold;
inserting, by the computing system, an annotation within data of the message flagging the message as an illegitimate message; and
causing, by a contextual filtering system of the computing system, the illegitimate message to be filtered by the wireless network provider.

8. The system of claim 7, wherein the wireless network provider provides an open radio access network.

9. The system of claim 8, wherein the open radio access network comprises a 5G wireless network implemented in a cloud-based architecture.

10. The system of claim 7, wherein the system utilizes an online learning algorithm to determine new characteristics associated with new illegitimate messages and updates the database to include the new characteristics.

11. A non-transitory computer-readable medium comprising instructions that, when executed by one or more processors, cause the one or more processors to perform operations comprising:

receiving, by a computing system of a wireless network provider, a message;
generating, by a machine learning module of the computing system, a combined score indicating a confidence interval that the message is illegitimate, the machine learning module comprising:
a link and attachment model configured to analyze a link and/or an attachment in the message and generate a first score indicating a likelihood that the message is illegitimate based on the link and/or the attachment;
a behavioral model configured to analyze data associated with the message and generate a second score indicating a likelihood that the message is illegitimate based on the data associated with the message;
a geographical model configured to analyze a geographical-metadata associated with the message and generate a third score indicating a likelihood that the message is illegitimate based on the geographical-metadata; and
a combinatory model configured to generate a combined score based on the first score, the second score, and the third score, wherein each of the first score, the second score, and the third score are dynamically weighted;
updating, by the computing system, a database to include the message, the first score, the second score, the third score, and/or the combined score;
providing, by the computing system, at least a portion of data on the database to the at least one machine learning module such that the combinatory model is retrained using at least one of the message or the combined score;
determining, by the computing system, that the combined score is greater than a predetermined threshold;
inserting, by the computing system, an annotation within data of the message flagging the message as an illegitimate message; and
causing, by a contextual filtering system of the computing system, the illegitimate message to be filtered by the wireless network provider.

12. The non-transitory computer-readable medium of claim 11, wherein the computing system utilizes an online learning algorithm to determine new characteristics associated with new illegitimate messages and updates the database to include the new characteristics.

13. The non-transitory computer-readable medium of claim 11, the operations further comprising:
determining, by the computing system, sender data associated with a sender of the message;
accessing, by the computing system, a database comprising historical sender data associated with historical illegitimate messages; and
determining, by the computing system and using a rules-based model, that the sender data corresponds to the historical sender data associated with historical illegitimate messages.

14. The non-transitory computer-readable medium of claim 11, the operations further comprising:
receiving, by the computing system, data from a sender associated with the message indicating one or more characteristics to be whitelisted; and
updating, by the computing system, the database to include the one or more characteristics to be whitelisted.

* * * * *